United States Patent [19]
Zaccaria et al.

[11] Patent Number: 6,088,632
[45] Date of Patent: Jul. 11, 2000

[54] ENGINE CONTROL SYSTEM FOR AN AIRCRAFT

[75] Inventors: Patrick Zaccaria, Toulouse; Patrice Ostermann, Blagnac, both of France

[73] Assignee: Societe Nationale Industrielle et Aerospatiale, Paris, France

[21] Appl. No.: 09/225,571

[22] Filed: Jan. 5, 1999

[30] Foreign Application Priority Data

Jan. 30, 1998 [FR] France ................................. 98 01056

[51] Int. Cl.$^7$ ................................................. G08B 23/00
[52] U.S. Cl. ......................... 701/3; 340/970; 340/973
[58] Field of Search ........................... 701/3, 114, 15, 701/120; 340/970, 973, 959; 244/175, 194, 234

[56] References Cited

U.S. PATENT DOCUMENTS

| | | | |
|---|---|---|---|
| 4,837,696 | 6/1989 | Lebrun et al. ........................ 340/959 |
| 5,270,931 | 12/1993 | Appleford . | |
| 5,398,186 | 3/1995 | Nakhla ................................. 364/428 |
| 5,457,634 | 10/1995 | Chakravarty ........................... 701/3 |
| 5,479,346 | 12/1995 | Lecomote et al. ..................... 701/114 |
| 5,548,510 | 8/1996 | Ebert et al. ........................... 701/3 |
| 5,550,736 | 8/1996 | Hay et al. ............................. 703/15 |
| 5,716,032 | 2/1998 | McIngvale ............................ 244/185 |

FOREIGN PATENT DOCUMENTS 0807897  11/1997  European Pat. Off. .

*Primary Examiner*—William A. Cuchlinski, Jr.
*Assistant Examiner*—Olga Hernandez
*Attorney, Agent, or Firm*—Stevens, Davis, Miller & Mosher, L.L.P.

[57] ABSTRACT

An engine control system for a first aircraft belonging to a family of aircraft which includes at least a second aircraft, the first aircraft having a maximum mass which is greater, within a predetermined limit, than that of the second aircraft. For an engine of the first aircraft, a first thrust command law controls a thrust of an engine of the first aircraft during take-off phase (T), and a second thrust command law, controls a thrust of the engine to correspond with a part of the thrust command laws applicable to the second aircraft during all other flight phases (R) of the first aircraft. The transition from one flight phase to another is detected to supply the engine with a control signal corresponding to one or the other of the first thrust command law or the second thrust command law.

12 Claims, 4 Drawing Sheets

ENGINE CONTROL SYSTEM FOR AN AIRCRAFT

The present invention relates to an engine control system for an aircraft.

As is known, there is nowadays an increasing trend for aeronautical manufacturers to provide families of aircraft, more specifically aeroplanes, which essentially differ by carrying capacities and operating ranges which differ.

The aircraft in a single family are generally equipped with the same engines, but governed by different thrust management laws, also known as thrust command laws. In a nutshell, a thrust command management law has the maximum thrust required of the engine as its main characteristic. An aeroplane lighter than a reference aeroplane will be equipped with an engine (or several engines) using a thrust command management law which allows less thrust to be obtained but is more economically advantageous.

Each type of aeroplane needs to be certified (that is to say it must be given the legal authorization needed for its use) for one sort of engine together with its thrust command management law.

When it is desired to produce a new version of an aeroplane in the same family, that is to say an aeroplane which is substantially identical to an already existing aeroplane but has an increase in mass (within defined limits), the choice of the thrust management law therefore constitutes one of the problems to be solved.

There were two obvious solutions, research and development of a new thrust management law or, where appropriate, use of the thrust command management law of the aeroplane with the next highest mass in the family of aircraft in question.

However, each of these two solutions requires repetition of all the certification procedures for the new aeroplane, this being for the entire flight profile, needing in particular very expensive series of flight trials.

The object of the present invention is to overcome this drawback.

To this end, the engine control system for a first aircraft belonging to a family of aircraft which includes at least a second aircraft. The first aircraft has a maximum mass which is greater, within a predetermined limit, than that of the second aircraft, which has a thrust command law for each engine. According to the invention, it is noteworthy that for each engine of the first aircraft, a first command law for the thrust of the engine, specific to the first aircraft during the take-off phase. In addition, a second command law for the thrust of the engine, corresponding to the part of the thrust command law applicable to the second aircraft during all the other flight phases, is provided; means for detecting the transition from one flight phase to another is provided in order to supply the engine with at least one control signal corresponding to one or other of the first and second thrust command laws.

The certification procedures can thus be reduced to the take-off phase, since for all the other flight phases, the aircraft (referred to as "first aircraft" below) will have the same "behaviour" as the one referred to as the "second aircraft", which leads to corresponding savings in time and cost.

Advantageously, the system uses either computer-processed or electronically-processed signals available from the first aircraft.

Preferably, it supplies a "take-off" signal and a "not take-off" signal, each signal being formed on the basis of two logics and parameters which are different.

Advantageously, the logic circuit will select the take-off thrust when:

the FADEC (Full Authority Digital Electronic Control) computer is powered up, OR (logic gate)

the thrust reverser has been deployed AND (logic gate) the throttle lever angle is less than a given value, which value indicates that the thrust reverser is selected, OR the "ground" status is maintained for a determined time.

Furthermore, the end of the take-off phase is determined by the fact that:

the engine is set to the maximum take-off thrust for a determined time, OR the Mach number Mn>0.35, AND the throttle lever is pulled back.

Moreover, the "ground" value used in the take-off thrust selection logic is selected when at least two sources among the following four available sources meet the desired criteria, the said sources being:

ADC1 Mn (<0.1 with reference to the selection strategy),

ADC2 Mn (<0.1 with reference to the selection strategy)

FADEC Mn (<0.15 calculated by its own probes) AND (logic gate) FADEC Mn is valid, LGCIU=ground AND (logic gate) LGCIU is valid, where ADC generally denotes the air data computer, FADEC an engine control computer, and LGCIU the landing gear control interface unit.

What is more, after the take-off phase has been completed, the thrust selection for another flight phase is based on the fact that:

the engine has operated at the take-off thrust for a determined time, OR the selected Mach number is greater than 0.35 AND the throttle lever is pulled back [and the so-called FLEX mode (corresponding to the fact that, for certain temperatures, the FADEC is fed with temperature parameters different from the actual temperature) is deselected] for a determined time.

In the latter case, the logic circuit includes:

a TLA=MCT input, MCT representing the maximum continuous speed, and TLA representing the throttle level angle, a FLEX mode input which are connected to an AND logic gate whose output is connected to an OR logic gate which, at its other input, receives the TLA=MCT signal, and the output of the OR logic gate is connected to an AND logic gate whose other input receives the signal corresponding to the engine speed, and, after confirmation that the engine has operated at the take-off thrust for a determined time, the corresponding signal is supplied to an OR logic gate which, at its other input, receives the "flight" status signal, the output of the logic gate being connected to a first computer, and an AND logic gate receives TLA≦MCT and the FLEX mode as inputs, and its output is connected to an AND logic gate, after confirmation for a determined time, whose other input receives the output signal of the first computer, the latter receiving as second input the output signal corresponding to the take-off thrust selection, also supplied as first input to a second computer whose second input is connected to the output of the logic gate, the output of the second computer corresponding to the thrust choice for a flight phase other than the take-off phase.

In particular, the "flight" value is selected when at least two sources of the following three available sources meet the desired criteria, the said sources being:
 ADC1 Mn (>0.35),
 ADC2 Mn (>0.35),
 FADEC Mn (>0.35) AND (logic gate) FADEC Mn is valid.

The figures of the appended drawings will clearly show how the invention may be embodied. In these figures, identical references denote similar elements.

FIG. 1 illustrates a first example of the principle for differentiating between two flight phases of an aircraft according to the invention.

FIG. 2, which is similar to FIG. 1, illustrates a second example of the principle for differentiating between two flight phases of an aircraft according to the invention.

As indicated above, the engine control system for a first aircraft 1 belonging to a family of aircraft which furthermore includes at least a second aircraft, the said first aircraft having a maximum mass which is greater, within a predetermined limit, than that of the second aircraft, which has a thrust command law for each engine, generally provides for each engine of the said first aircraft, a first command law for the thrust of the said engine, specific to the said first aircraft 1 during the take-off phase T, and a second command law for the thrust of the engine, corresponding to the part of the said thrust command law applicable to the second aircraft during all the other flight phases R, means 2,22 for detecting the transition from one flight phase to another being provided in order to supply the engine with at least one control signal corresponding to one or other of the first and second thrust command laws.

What is more, the system uses the signals which are available on the aircraft and are either computer-processed (algorithms) or are electronically processed (logic gates, multivibrators, etc.).

Furthermore, for reliability reasons, the system supplies a "take-off" signal and a "not take-off" signal, each signal being formed on the basis of two logics and parameters which are different. It this regard it will be noted that any simultaneous occurrence of the two signals only could be due to at least a double malfunction of the system.

Figure 1:
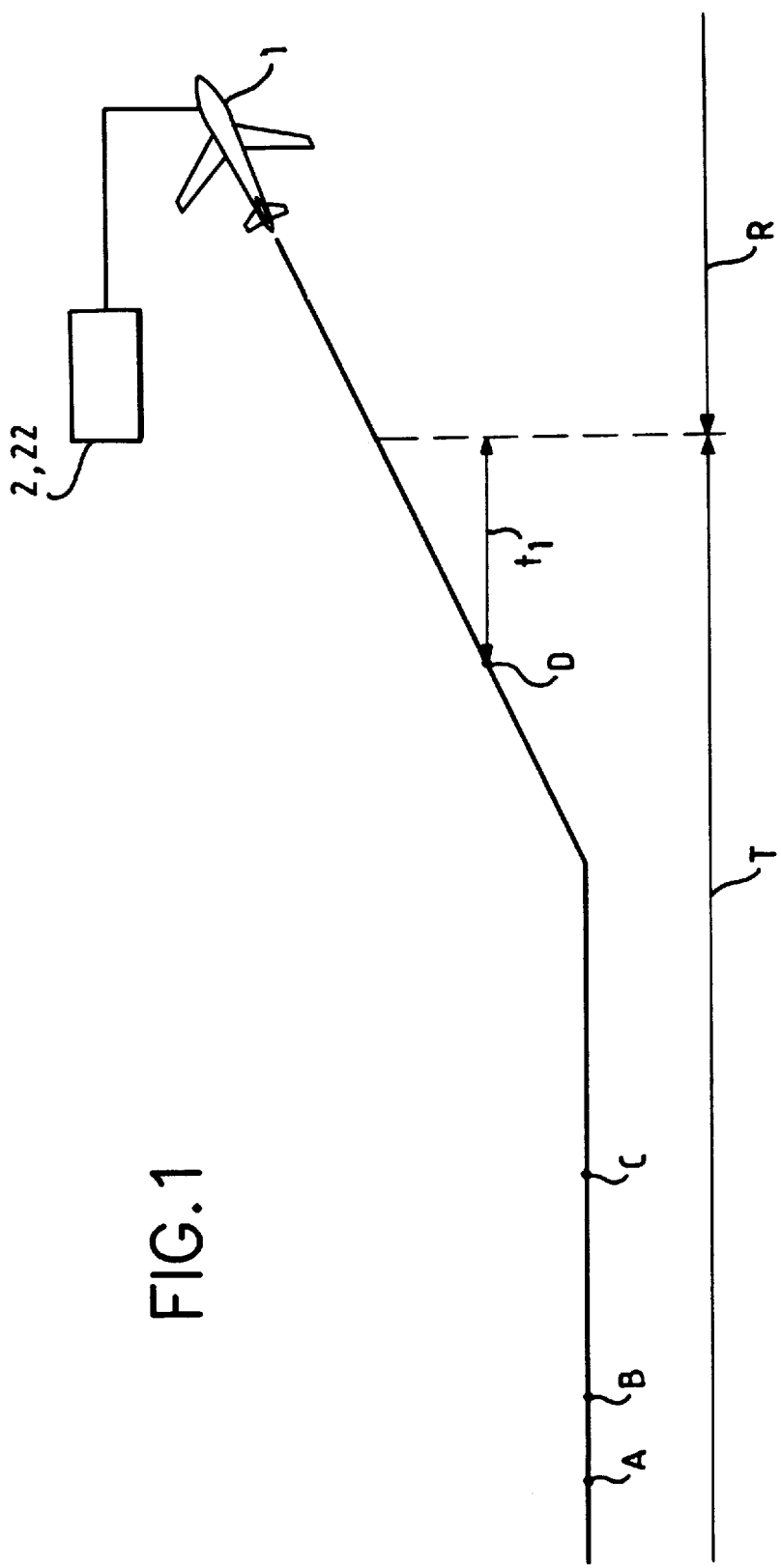

FIG. 1, illustrating a first example of the principle for differentiating between two flight phases of an aircraft (take-off T and overshoot R), indicates a certain number of points representing the differentiation between take-off phase T/other phase (overshoot) R:
 A: beginning of the engine start-up sequence (powering up of the FADEC computer),
 B: starting up the engines,
 C: throttle lever at take-off angle,
 D: TLA≦ICT and no FLEX mode for a determined time t1 (for example equal to 20 seconds) (TLA=Throttle Lever Angle and MCT=Max Continuous, and the FLEX mode corresponding to the fact that, for certain temperatures, the FADEC is fed with temperature parameters different from the actual temperature).

Figure 2:
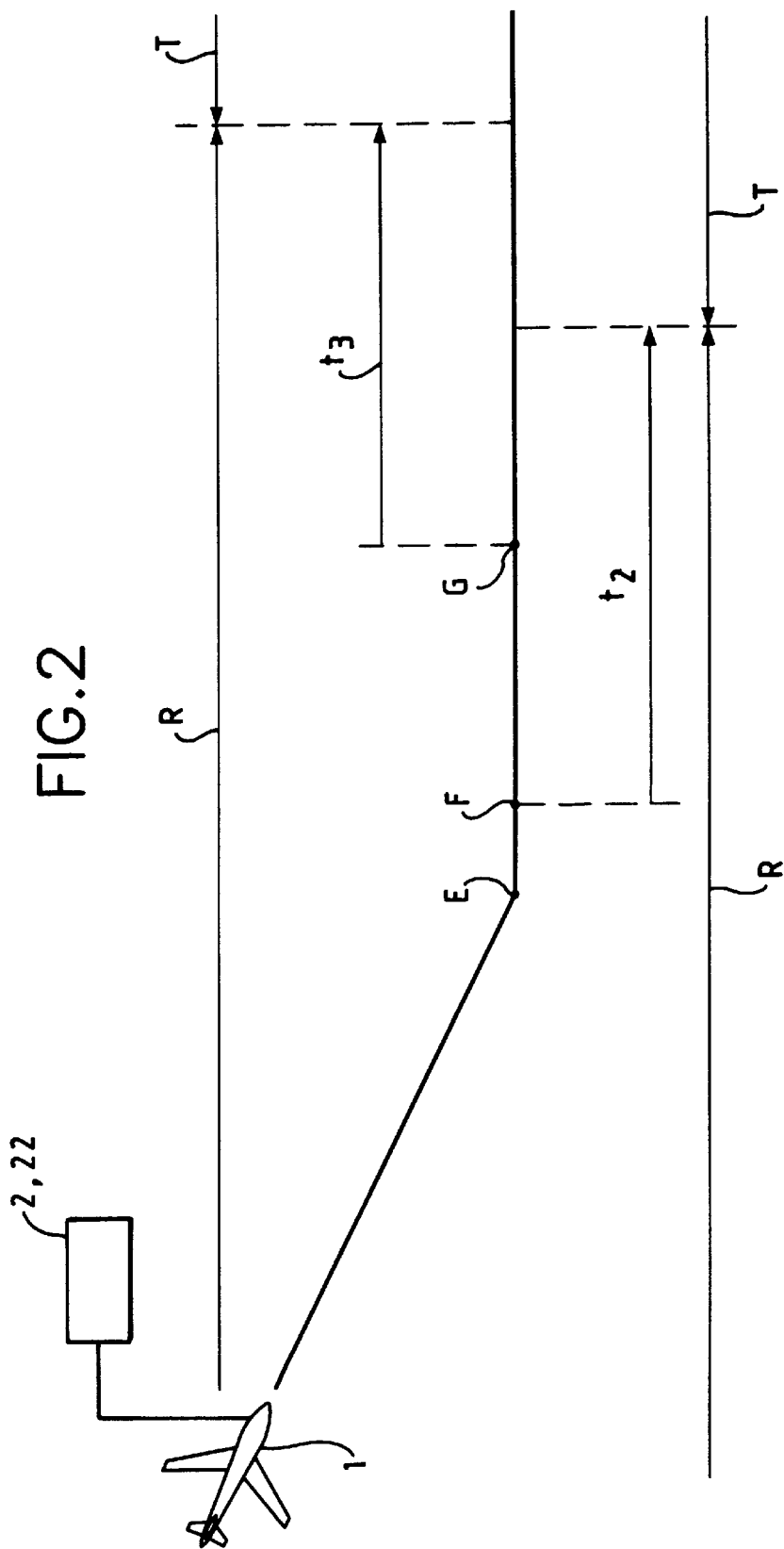

FIG. 2, illustrating a second example of the principle for differentiating between two flight phases (R and T) of an aircraft according to the invention, indicates a certain number of points representative of this principle:
 E: ground (LGCIU 32 Landing Gear Control Interface Unit),
 F: Mn (Mach number)=0.15 (FADEC) for a determined time t2, for example 30 seconds, for transition from the R phase to the T phase (take-off) (bottom of FIG. 2) in the case when LGCIU and Mn FADE:C are available, but T/R (thrust reverser) is inoperative,
 G : Mn=0.1 for a determined time t3, for example 30 seconds, for transition from the R phase to the T phase (take-off) (top of FIG. 2) in the case when LGCIU and Mn FADEC are not available and T/R is inoperative.

It will be noted that, in the nominal case, the take-off thrust will be selected when the thrust reverser is selected and fully deployed.

Figure 3:
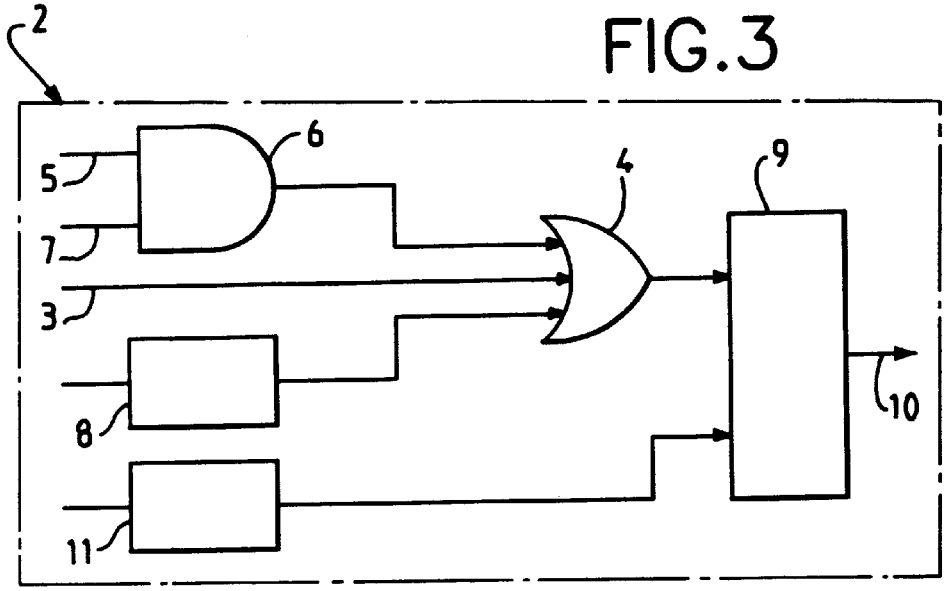
FIG. 3 is a logic circuit illustrating the principle of the selection of the take-off thrust within the scope of the invention.

The selection of the take-off thrust, illustrated by the logic circuit 2 in FIG. 3, will take place when,
 the FADEC computer 3 (in which the thrust command laws are installed) is powered up, OR (logic gate 4)
 the thrust reverser 5 has been deployed AND (logic gate 6) the throttle lever angle (TLA) 7 is less than a given value, for example less than or equal to 4.3°, OR
 the logic device 8 indicating that the "ground" status [based on the landing gear control interface unit (LGCIU) and the Mach number (Mn)] is maintained for more than 30 seconds, for example.

With reference to FIG. 3, it will be noted that the output of the logic gate 4 is connected to a computer 9, whose output 10 supplies the take-off thrust selection signal and which furthermore receives from 11 the signal corresponding to another flight phase (in particular overshoot).

This logic makes it possible to choose "take-off":
 after landing,
 after an aborted "take-off" if "overshoot" was selected,
 after an engine malfunction or before an engine start-up.

The end of the take-off phase will be determined by the fact that:
 the engine is set to the maximum take-off thrust for 20 seconds (for example), OR
 Mn>0.35
 AND the throttle lever is pulled back, with confirmation for 20 seconds that the throttle lever angle is less than or equal to the engine speed used when the other is malfunctioning (MCT=Max Continuous).

At this moment, the overshoot thrust will be selected.

Figure 4:
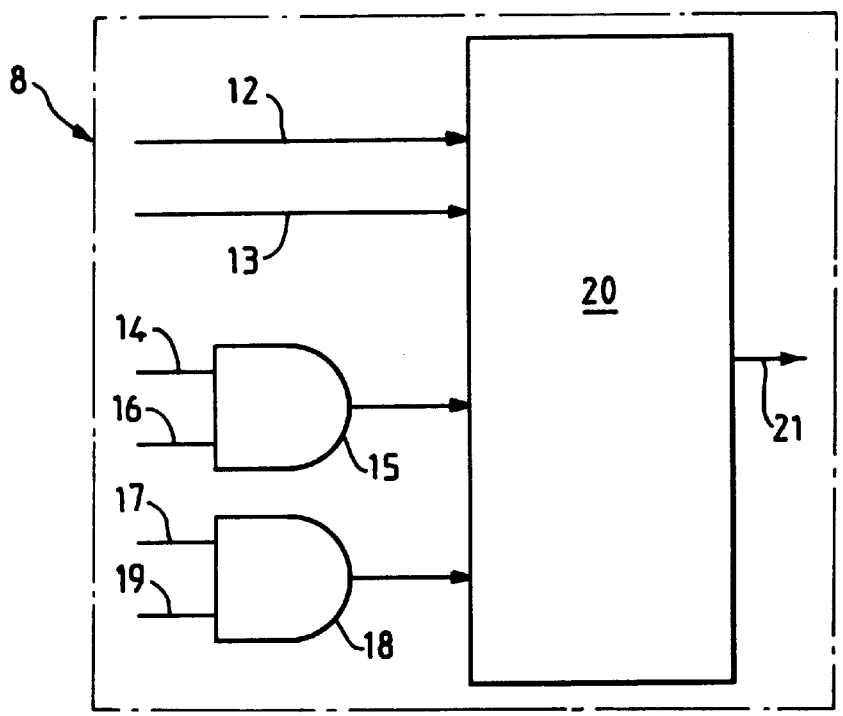
FIG. 4 is a logic circuit forming part and giving details of the one in FIG. 3.

In regards to the "ground" status determination by logic device 8 (FIG. 4) for the selection of the take-off thrust, four sources are available:
 ADC1 Mn (<0.1 with reference to the selection strategy) 12,
 ADC2 Mn (<0.1 with reference to the selection strategy) 13,
 FADEC Mn (<0.15 calculated by its own probes) (14) AND (logic gate 15) FADEC Mn is valid (16),
 LGCIU =ground (17) AND (logic gate 18) LGCIU is valid (19),

[ADC generally denotes the Air Data Computer which, in particular, supplies the pressure, the temperature and the Mach number].

At least two sources connected to the computer 20 need to meet the desired criteria in order to select the "ground" value (21) used in the take-off thrust selection logic.

The overshoot thrust selection (illustrated by the logic circuit 22 in FIG. 5) will be made after completion of the take-off phase.

The criteria will be based on the fact that:

the engine has operated at the take-off thrust for more than 20 seconds (for example), OR the selected Mach number is greater than 0.35 AND the throttle lever is pulled back to MCT or less [and the so-called FLEX mode (corresponding to the fact that, for certain (hot) temperatures, the FADEC is fed with temperature parameters different from the actual temperature) is deselected] for more than 20 seconds.

Figure 5:
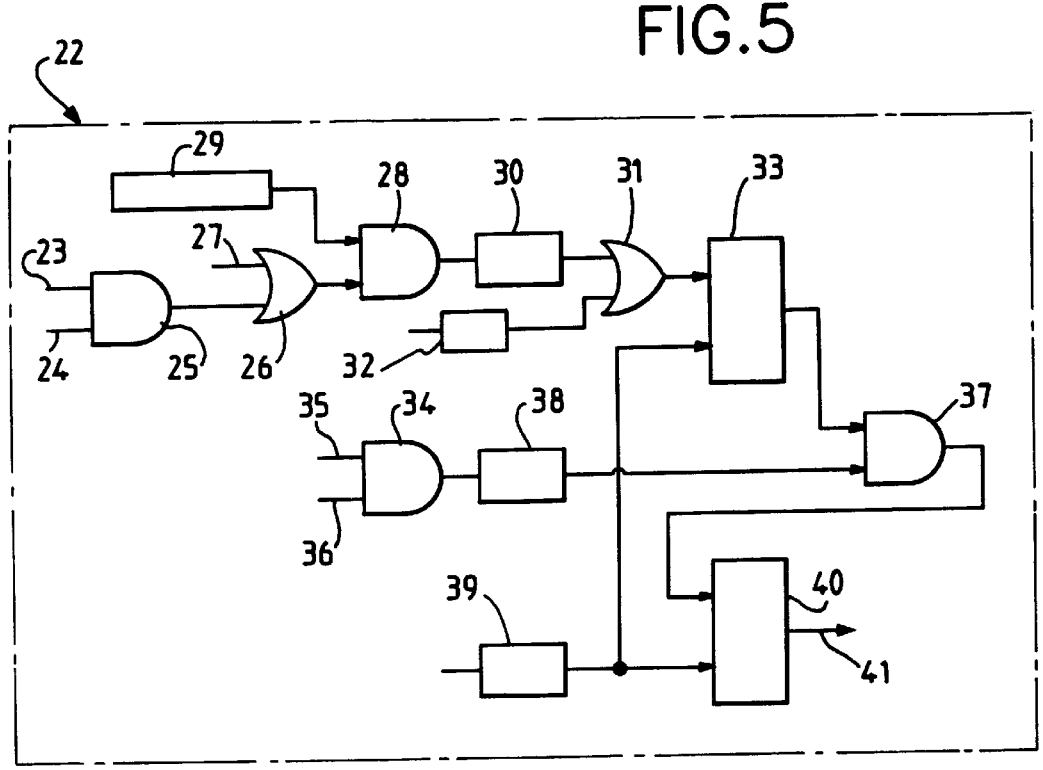
FIG. 5 is a logic circuit illustrating the principle of the selection of the overshoot thrust, within the scope of the invention.

More precisely, the logic circuit 22 illustrated in FIG. 5 includes:

a TLA=MCT input 23, a FLEX mode input 24 which are connected to an AND logic gate 25 whose output is connected to an OR logic gate 26 which, at its other input 27, receives the TLA=MCT signal.

Furthermore, the output of the OR logic gate 26 is connected to an AND logic gate 28 whose other input receives from 29 the signal corresponding to the engine speed, the purpose of which is to indicate that the engine is at take-off power.

Figure 6:
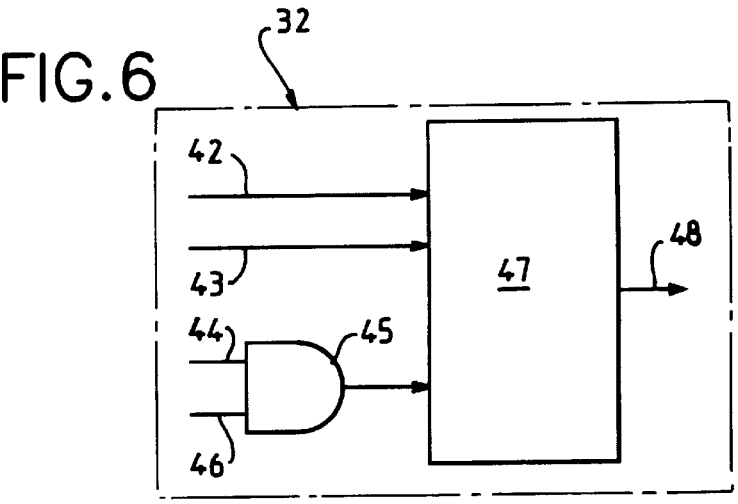
FIG. 6 is a logic circuit forming part and giving details of the one in FIG. 3.

After confirmation that the engine has operated at the take-off thrust for more than 20 seconds (30), the corresponding signal is supplied to an OR logic gate 31 which, at its other input 32, receives the "flight" status signal, determined as indicated below with reference to FIG. 6. The output of the logic gate 31 is connected to the computer 33.

What is more, an AND logic gate 34 receives TLA$\leq$MCT 35 and the FLEX mode 36 as inputs, and its output is connected to an AND logic gate 37, after confirmation for 20 seconds (38), whose other input receives the output signal of the computer 33, the latter receiving as second input the output signal (from 39) corresponding to the take-off thrust selection (10 second pulse), also supplied as first input to the computer 40 whose second input is connected to the output of the logic gate 37. The output 41 of the computer 40 corresponds to the choice of the overshoot thrust (or more generally a flight phase other than the take-off phase).

As soon as the overshoot thrust is selected, it must be locked until the next selection of the take-off thrust.

As regards the "flight" determination (FIG. 6) for the selection of the overshoot thrust, three sources are available:

ADC1 Mn (>0.35) 42,

ADC2 Mn (>0.35) 43,

FADEC Mn (>0.35) 44 AND (logic gate 45) FADEC Mn is valid (46).

At least two sources connected to the computer 47 must meet the desired criteria in order to select the "flight" value (48) used in the overshoot thrust selection logic.

The flight/ground determination by ADC Mn may be made under the following conditions:

for the "flight" condition:
the ADC value must be valid AND
Mn >0.35 for the "ground" condition:
when Mn of the aircraft is less than 0.1, the ADC Mn indication is sent to NCD (Non Computed Data) with a zero value. This condition will be used to determine that the aircraft is on the ground provided that the last good value was less than 0.15.

We claim:

1. An engine control system for a first aircraft belonging to a family of aircraft which further includes at least a second aircraft, and wherein said first aircraft has a maximum mass which is greater, within a predetermined limit, than a maximum mass of said second aircraft, and wherein said engine control system includes thrust command means for providing thrust command laws for at least one engine of said first aircraft, said second aircraft having thrust command laws applicable thereto, said thrust command laws for said first aircraft comprising:

a first thrust command law controlling a thrust of said at least one engine of said first aircraft for use during a take-off phase;

a second thrust command law controlling a thrust of said at least one engine to correspond with a part of said thrust command laws applicable to said second aircraft for use during at least one flight phase other than said take-off phase; and said engine control system further comprising detecting means for detecting a transition between said take-off phase and said at least one flight phase other than said take-off phase so that said thrust command means supplies said at least one engine of said first aircraft with at least one control signal corresponding to one or the other of said first thrust command law and said second thrust command law.

2. The engine control system according to claim 1, wherein said at least one engine comprises a plurality of engines of said first aircraft.

3. The engine control system according to claim 1, wherein said at least one flight phase comprises all flight phases except said take-off phase.

4. The engine control system according to claim 1 wherein said system uses computer-processed signals available from said first aircraft.

5. The engine control system according to claim 1 wherein said system uses electronically processed signals available from said first aircraft.

6. The engine control system according to claim 1 wherein said system supplies a "take-off" signal and a "not take-off" signal, each signal being formed on the basis of two logics and parameters which are different.

7. The engine control system according to claim 1 further comprising a logic circuit for selecting a thrust for the take-off phase for at least one of the following conditions:

(i) a Full Authority Digital Electronic Control (FADEC) computer is powered up, (ii) a thrust reverser has been deployed AND a throttle lever angle is less than a given value, and (iii) a "ground" status is maintained for a determined time.

8. The engine control system according to claim 7, wherein an end of the take-off phase (T) is determined by at least one of the following conditions:

(i) the engine is set to the maximum take-off thrust for a determined time, and (ii) the Mach number Mn>0.35, AND the throttle lever is pulled back.

9. The engine control system according to claim 7, wherein the "ground" value used in said logic circuit during the thrust selection in the take-off phase is selected when at least two sources among the following four available sources meet a desired criteria, the four available sources being:

(i) an ADC1 Mn (<0.1 with reference to the selection to the selection strategy), (ii) an ADC2 Mn (<0.1 with reference to the selection to the selection strategy), (iii) a FADEC Mn (<0.15 calculated by its own probes) (14) AND FADEC Mn is valid (16), (iv) a LGCIU=ground AND LGCIU is valid, where ADC generally denotes the air data computer, FADEC is an engine control computer, and LGCIU is the landing gear control interface unit.

10. The engine control system according to claim 7, wherein, after the take-off phase has been completed, the thrust selection for another flight phase (R) is based on at least one of the following:

(i) the engine has operated at the take-off thrust for a determined time, and (ii) the selected Mach number is greater than 0.35 AND the throttle lever is pulled back and the FLEX mode (corresponding to the fact that, for certain temperatures, the FADEC is fed with temperature parameters different from the actual temperature) is deselected for a determined time.

11. The engine control system according to claim 10, wherein said logic circuit further comprises:

a TLA=MCT input, wherein MCT represents a maximum continuous speed, and TLA represents a throttle lever angle, and a FLEX mode input, wherein both of said TLA=MCT and FLEX mode inputs are connected to an AND logic gate whose output is connected to an OR logic gate which, at its other input, receives the TLA=MCT signal, and the output of the OR logic gate is connected to an AND logic gate whose other input receives a signal corresponding to the engine speed, and, after confirmation that the engine has operated at the take-off thrust for a determined time, the corresponding signal is supplied to an OR logic gate which, at its other input, receives the "flight" status signal, the output of the logic gate being connected to a first computer, and an AND logic gate receives TLA$\leq$MCT and FLEX mode as inputs, and its output is connected to an AND logic gate, after confirmation for a determined time, whose other input receives the output signal of the first computer, the latter receiving as a second input the output signal corresponding to the take-off thrust selection, also supplied as first input to a second computer whose second input is connected to the output of the logic gate, and an output of the second computer corresponding to the thrust choice for a flight phase (R) other than the take-off phase.

12. The engine control system according to claim 11, wherein the "flight" value is selected when at least two sources of the following three available sources meet the desired criteria, the said sources being:

(i) ADC1 Mn (>0.35), (ii) ADC2 Mn (>0.35), (iii) FADEC Mn (<0.35) AND FADEC Mn is valid.

* * * * *

UNITED STATES PATENT AND TRADEMARK OFFICE
CERTIFICATE OF CORRECTION

PATENT NO. : 6,088,632
DATED : July 11, 2000
INVENTOR(S) : Zaccaria et al.

It is certified that error appears in the above-identified patent and that said Letters Patent are hereby corrected as shown below:

The Assignee should read: --Aerospatiale Societe Nationale Industrielle-- and not "Societe Nationale Industrielle Et Aerospatiale".

Signed and Sealed this

Twenty-second Day of May, 2001

*Attest:*

NICHOLAS P. GODICI

*Attesting Officer*  Acting Director of the United States Patent and Trademark Office